US012715515B2

(12) United States Patent
Lee et al.

(10) Patent No.: US 12,715,515 B2
(45) Date of Patent: Aug. 25, 2026

(54) ELECTRIC VEHICLE BODY

(71) Applicant: POSCO Co., Ltd, Pohang-si (KR)

(72) Inventors: Hong-Woo Lee, Incheon (KR); Jaehyun Kim, Incheon (KR); Dong-Yoon Seok, Seoul (KR)

(73) Assignee: POSCO CO., LTD, Pohang-si (KR)

( * ) Notice: Subject to any disclaimer, the term of this patent is extended or adjusted under 35 U.S.C. 154(b) by 555 days.

(21) Appl. No.: 18/039,934

(22) PCT Filed: Nov. 16, 2021

(86) PCT No.: PCT/KR2021/016716
§ 371 (c)(1),
(2) Date: Jun. 1, 2023

(87) PCT Pub. No.: WO2022/119176
PCT Pub. Date: Jun. 9, 2022

(65) Prior Publication Data

US 2024/0001992 A1 Jan. 4, 2024

(30) Foreign Application Priority Data

Dec. 2, 2020 (KR) ........................ 10-2020-0166765

(51) Int. Cl.
*B62D 21/15* (2006.01)
*B60K 1/04* (2019.01)
(Continued)

(52) U.S. Cl.
CPC .............. *B62D 21/155* (2013.01); *B60K 1/04* (2013.01); *B60L 50/64* (2019.02); *B60L 50/66* (2019.02);
(Continued)

(58) Field of Classification Search
USPC ....................................... 296/187.09, 187.11
See application file for complete search history.

(56) References Cited

U.S. PATENT DOCUMENTS 7,883,113 B2 * 2/2011 Yatsuda ............... B62D 25/082 180/311
8,585,133 B2 * 11/2013 Yasuhara ........... B62D 25/2018 296/203.03

(Continued)

FOREIGN PATENT DOCUMENTS

CN 108016504 A 5/2018
EP 3611080 A1 2/2020

(Continued)

OTHER PUBLICATIONS

Extended European Search Report dated Apr. 22, 2024 issued in European Patent Application No. 21900864.6.

(Continued)

*Primary Examiner* — Amy R Weisberg
*Assistant Examiner* — Veronica M Condo
(74) *Attorney, Agent, or Firm* — Morgan Lewis & Bockius LLP

(57) ABSTRACT

The present invention relates to an electric vehicle body capable of minimizing the intrusion of a collision load into a passenger space and a battery space during a front-end or rear-end collision, and comprises: a front side member having one side coupled to a front bumper beam, and the other side branching off to include a first branch part and a second branch part; a first front cross member coupled to the first branch part and the second branch part; a side seal coupled to the second branch part; a front subframe coupled to the front side member; and a battery case, which includes a reinforcing member extended in the longitudinal direction of the vehicle body and is coupled to the side seal and the first front cross member.

20 Claims, 10 Drawing Sheets

(51) Int. Cl.

| | |
|---|---|
| ***B60L 50/60*** | (2019.01) |
| ***B60L 50/64*** | (2019.01) |
| ***H01M 50/209*** | (2021.01) |
| ***H01M 50/249*** | (2021.01) |

(52) U.S. Cl.

CPC ....... *H01M 50/209* (2021.01); *H01M 50/249* (2021.01); *B60K 2001/0438* (2013.01); *H01M 2220/20* (2013.01)

(56) References Cited

U.S. PATENT DOCUMENTS

| | | | | |
|---|---|---|---|---|
| 8,739,910 | B2 | 6/2014 | Katayama et al. | |
| 8,794,696 | B2 | 8/2014 | Iseki et al. | |
| 9,937,781 | B1 * | 4/2018 | Bryer | B62D 35/02 |
| 10,518,621 | B2 * | 12/2019 | Nitta | H01M 50/24 |
| 10,882,557 | B2 * | 1/2021 | Otoguro | B60K 1/04 |
| 11,230,321 | B2 * | 1/2022 | Jung | B62D 21/03 |
| 11,524,726 | B2 | 12/2022 | Fujisawa et al. | |
| 2004/0134699 | A1 | 7/2004 | Shimizu | |
| 2005/0212334 | A1 | 9/2005 | Murata et al. | |
| 2015/0008703 | A1 | 1/2015 | Furusaki et al. | |
| 2017/0129432 | A1 | 5/2017 | Daido et al. | |
| 2017/0305249 | A1 | 10/2017 | Hara | |
| 2017/0368924 | A1 | 12/2017 | Jeong | |
| 2018/0011827 | A1 | 1/2018 | Avery et al. | |
| 2018/0162447 | A1 | 6/2018 | Fees et al. | |
| 2019/0061830 | A1 * | 2/2019 | Fujisawa | B62D 25/08 |
| 2019/0248416 | A1 | 8/2019 | Kato et al. | |
| 2020/0023905 | A1 | 1/2020 | Kawase | |
| 2020/0172167 | A1 * | 6/2020 | Watanabe | B62D 21/155 |
| 2020/0180701 | A1 | 6/2020 | Shin et al. | |
| 2020/0194755 | A1 * | 6/2020 | Maryanski | B60L 50/64 |
| 2021/0091352 | A1 * | 3/2021 | Weicker | B60L 50/64 |
| 2021/0101463 | A1 * | 4/2021 | Matsushima | B62D 25/2036 |
| 2021/0179193 | A1 * | 6/2021 | Kim | B62D 25/2027 |
| 2022/0032758 | A1 * | 2/2022 | Kaneko | B62D 21/11 |

FOREIGN PATENT DOCUMENTS

| | | | |
|---|---|---|---|
| JP | H06-115362 | A | 4/1994 |
| JP | 2004-9986 | A | 1/2004 |
| JP | 2005-162144 | A | 6/2005 |
| JP | 2012-201283 | A | 10/2012 |
| JP | 2013-105615 | A | 5/2013 |
| JP | 2013-154880 | A | 8/2013 |
| JP | 2015-116972 | A | 6/2015 |
| JP | 2016-052862 | A | 4/2016 |
| JP | 2017-193288 | A | 10/2017 |
| JP | 2018-039314 | A | 3/2018 |
| JP | 2018-140711 | A | 9/2018 |
| JP | 2019-137353 | A | 8/2019 |
| JP | 2020-90270 | A | 6/2020 |
| JP | 2022-096981 | A | 6/2022 |
| KR | 10-2017-0067606 | A | 6/2017 |
| KR | 10-1795399 | B1 | 11/2017 |
| KR | 10-2019-0001673 | A | 1/2019 |
| WO | 2009/008426 | A1 | 1/2009 |
| WO | 2011/055695 | A1 | 5/2011 |
| WO | 2015/072288 | A1 | 5/2015 |
| WO | 2019/198753 | A1 | 10/2019 |
| WO | 2020/065864 | A1 | 4/2020 |

OTHER PUBLICATIONS

International Search Report dated Mar. 11, 2022, issued in International Patent Application No. PCT/KR2021/016716 (with English translation).

Office Action dated Jun. 13, 2025 issued in corresponding Chinese Patent Application No. 202180080691.9 with English translation. (Note: JP 2017-193288 A, WO 2020/065864 A1, and JP 2015-116972 A already submitted.).

Japanese Decision to Grant dated Jan. 7, 2025 issued in Japanese Patent Application No. 2023-533700 (with English translation).

Decision of Grant dated Nov. 11, 2025 issued in the corresponding Japanese Patent Application No. 2024-173891. 1 (Note: WO 2019-198753 A1, Jp 2013-105615 A, and JP 2016-052862 A already submitted.).

* cited by examiner

【FIG. 1】
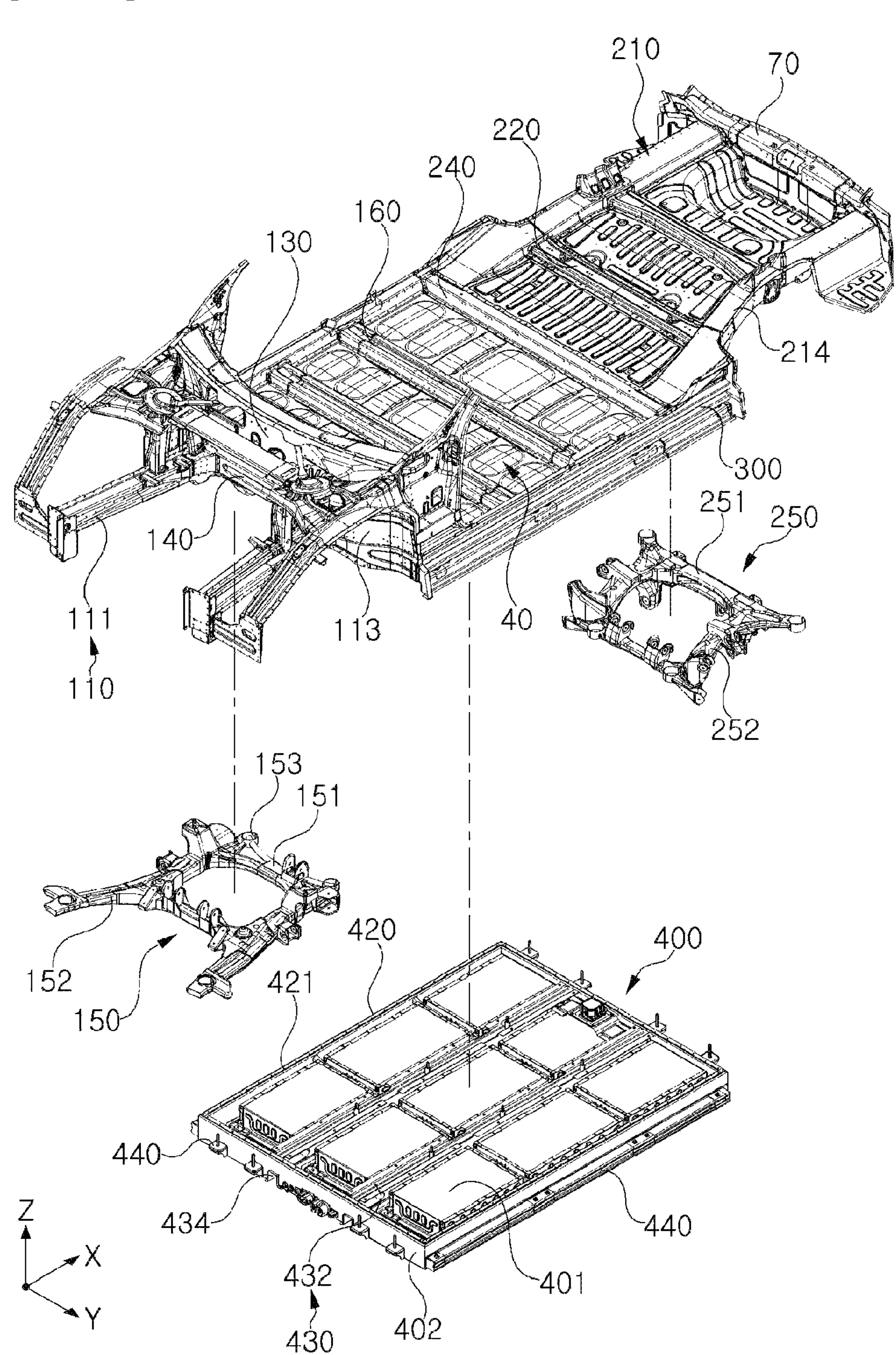

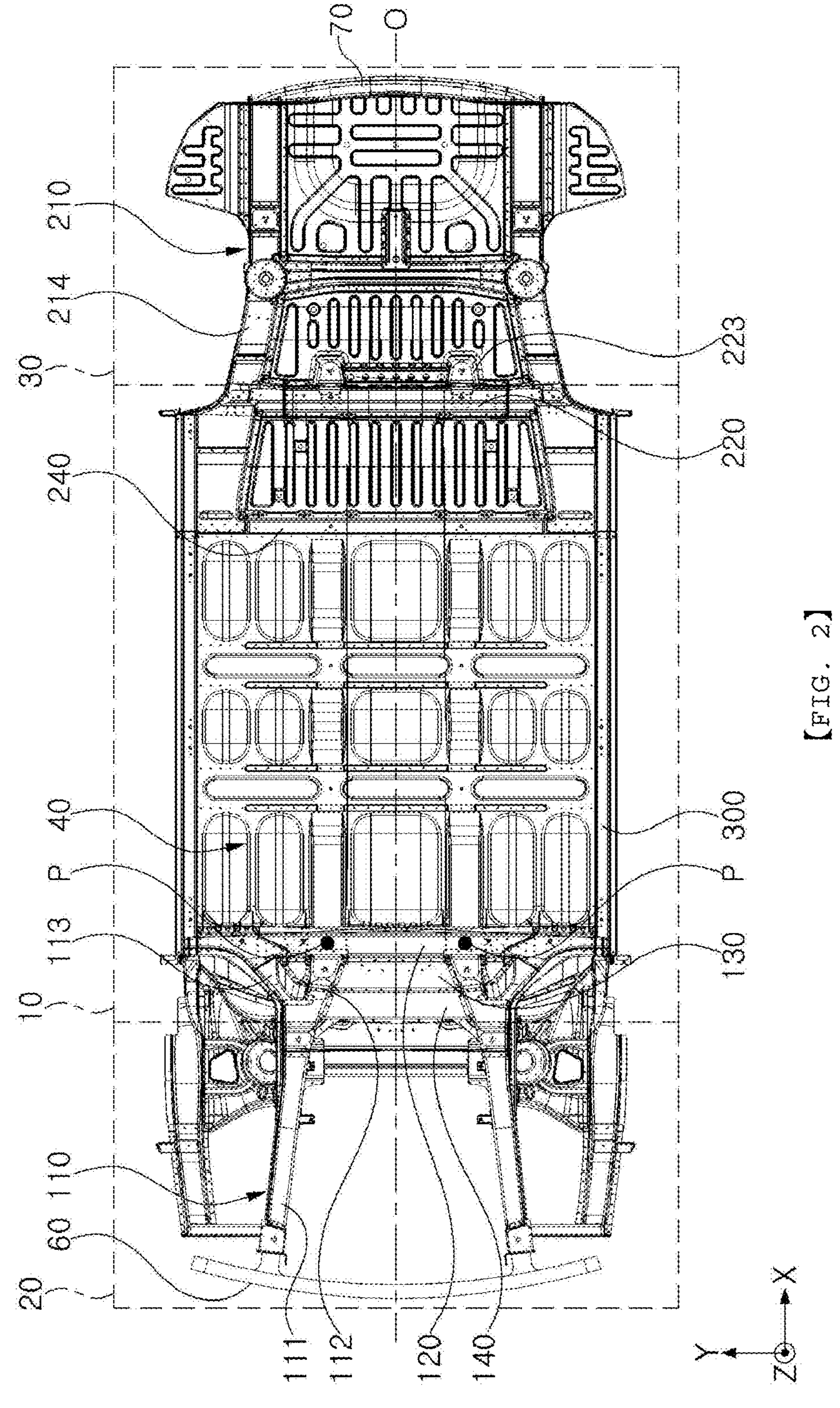
【FIG. 2】

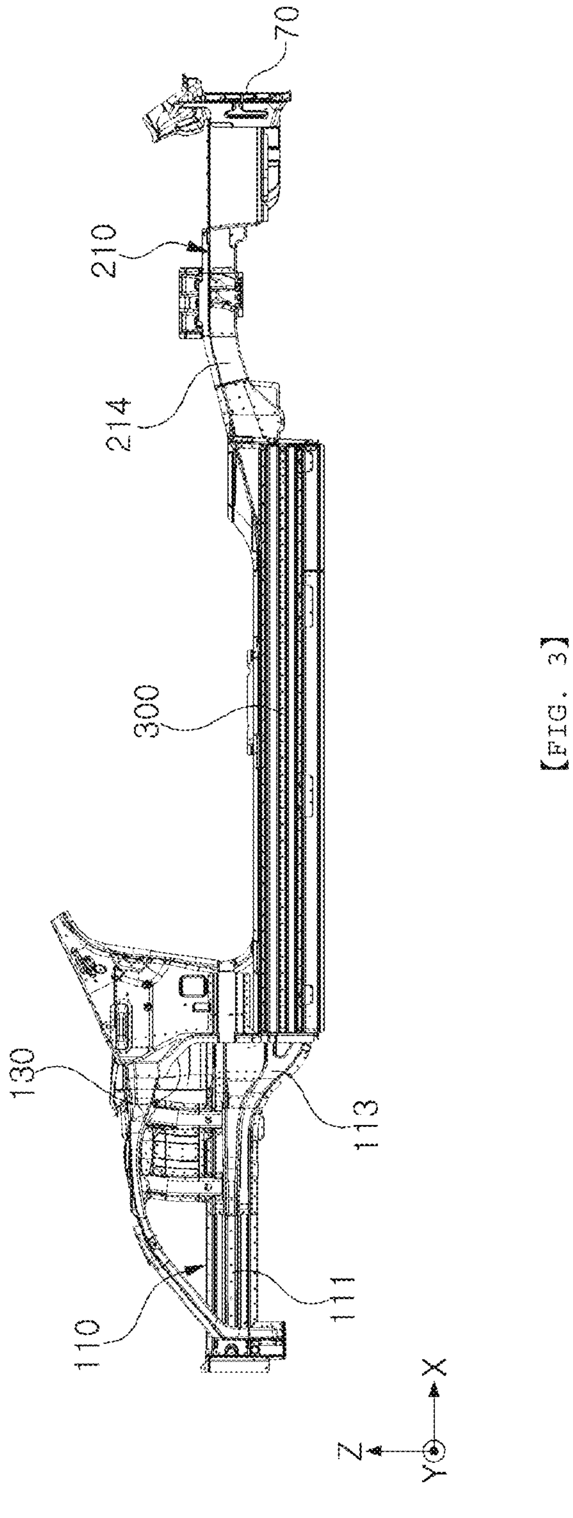
【FIG. 3】

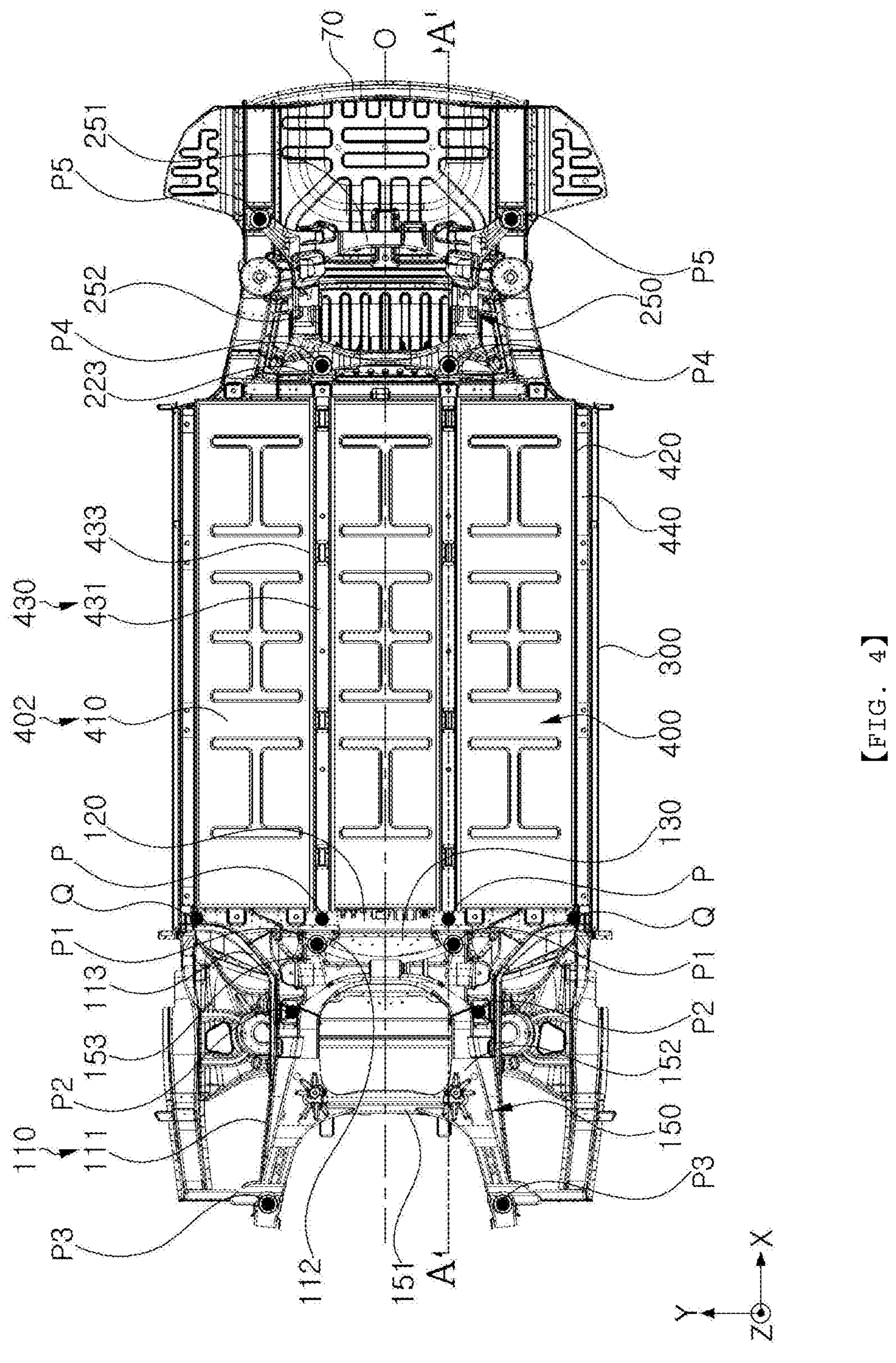
【FIG. 4】

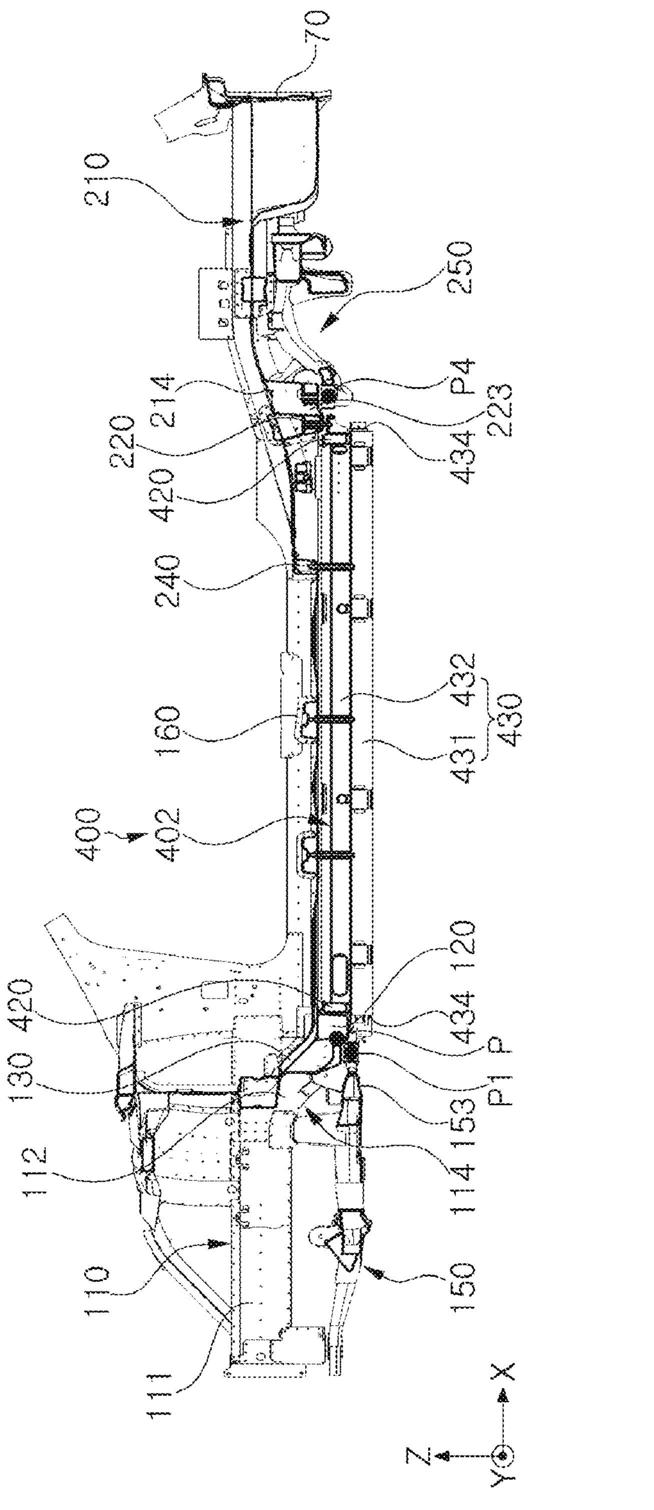
【FIG. 5】

【FIG. 6】
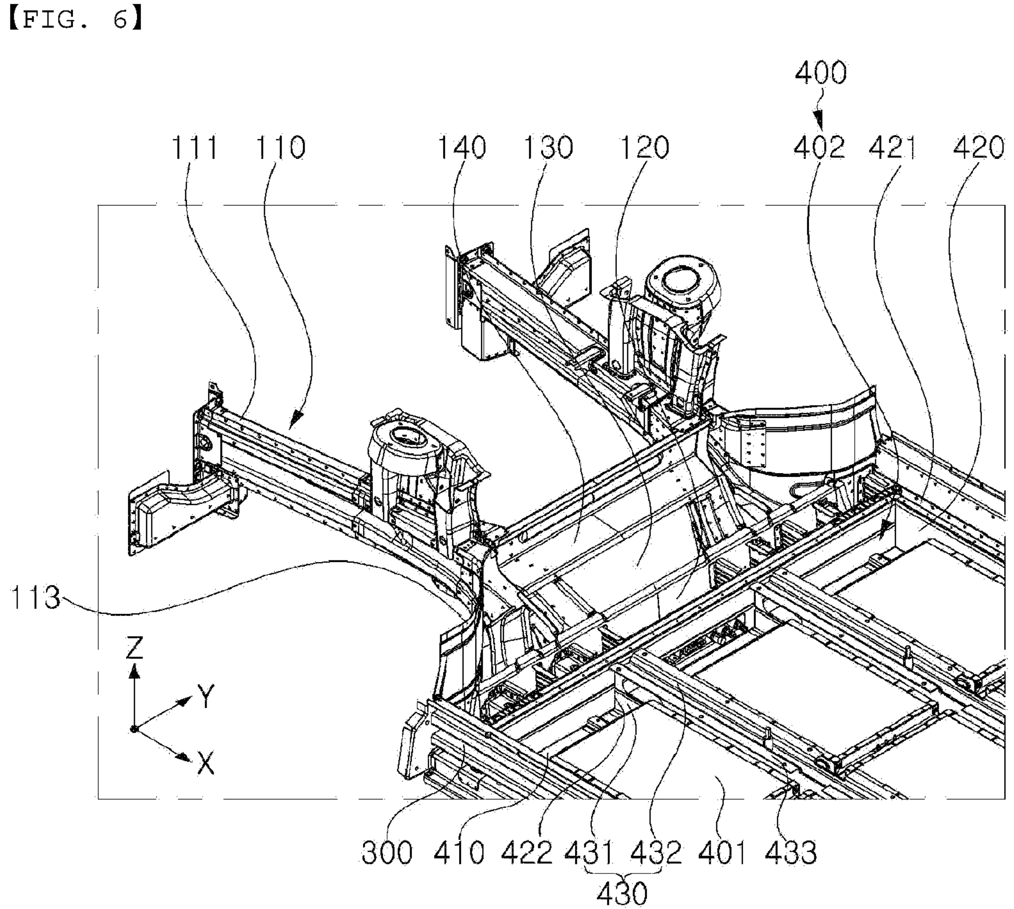

【FIG. 7】
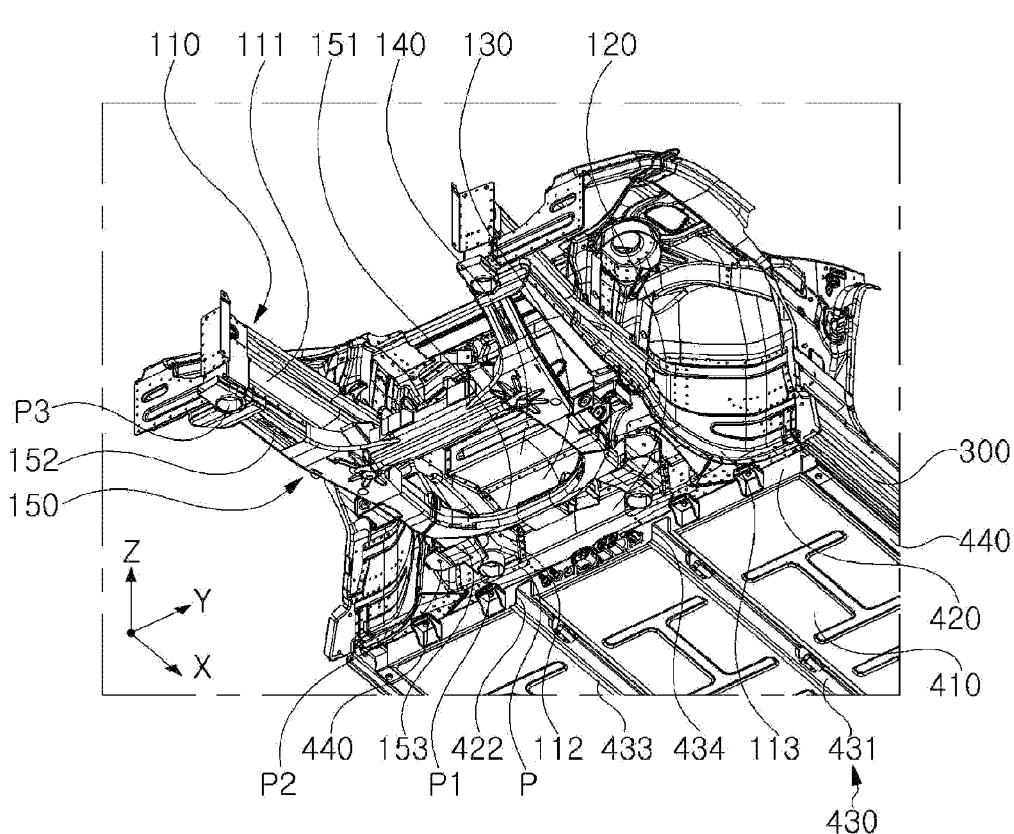

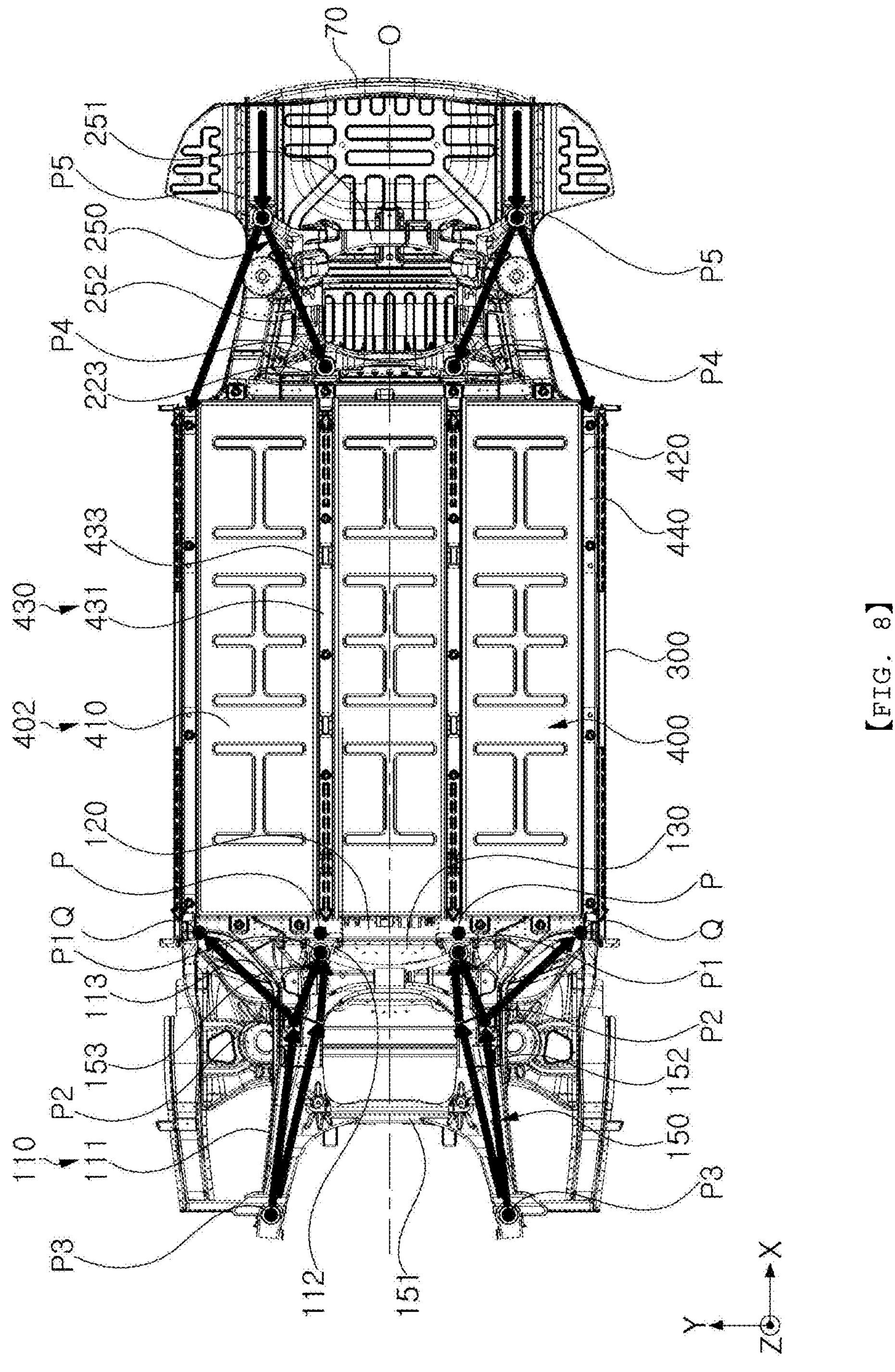
【FIG. 8】

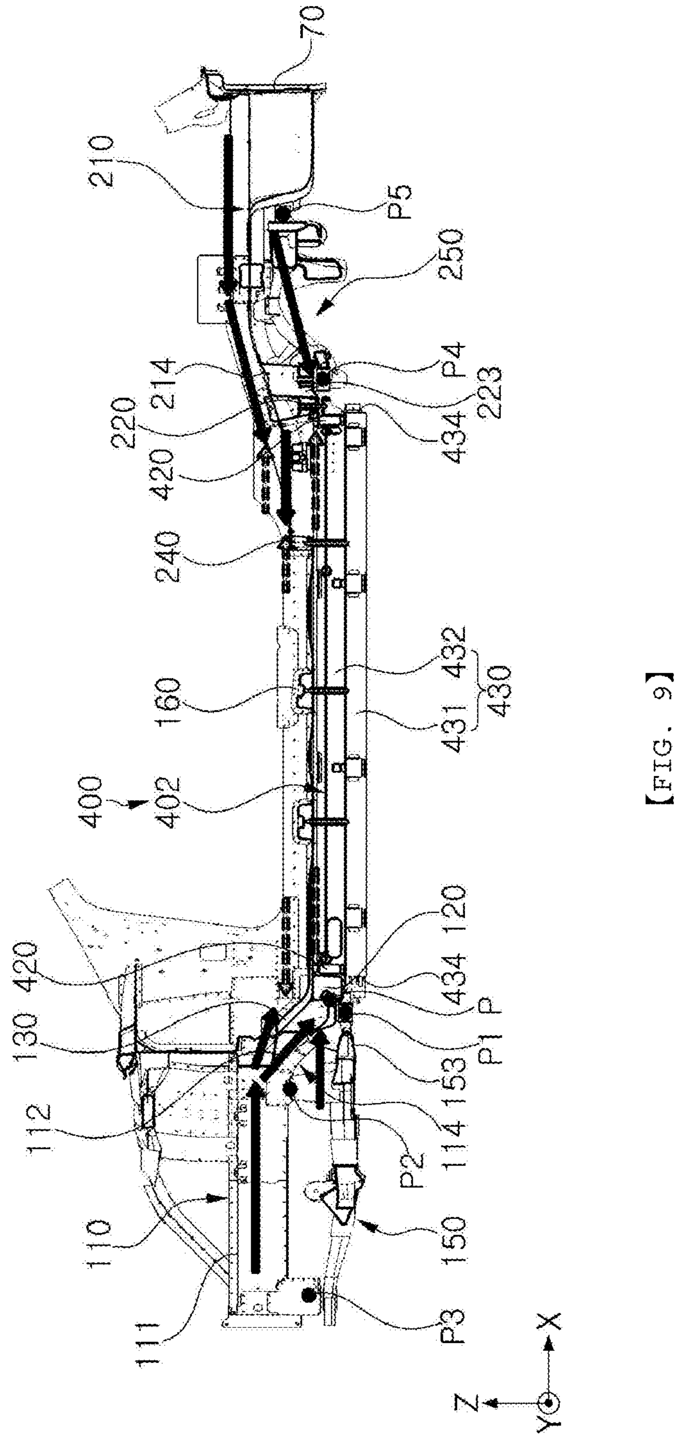
【FIG. 9】

【FIG. 10】
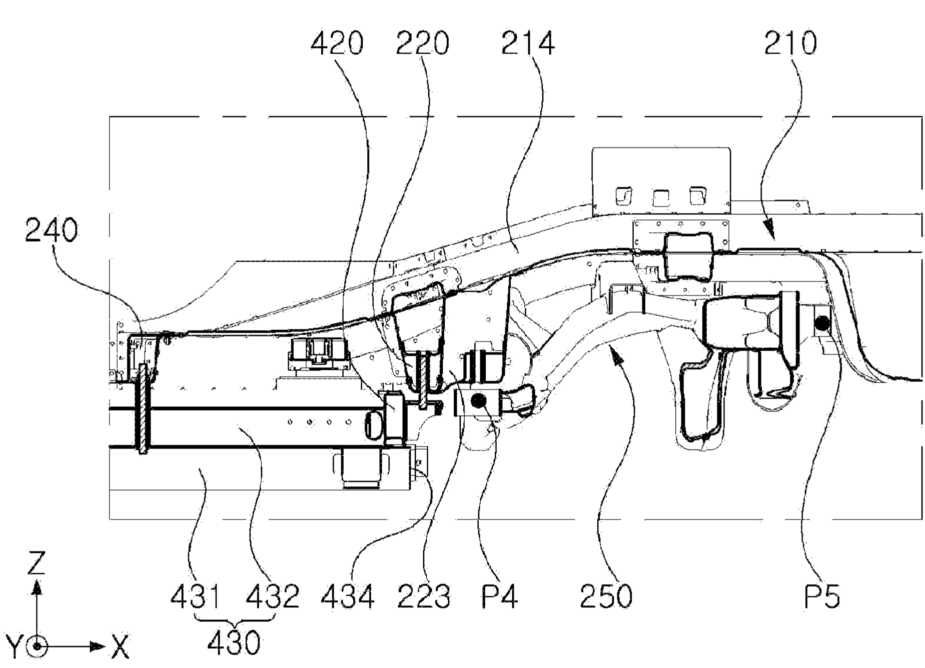

ELECTRIC VEHICLE BODY

CROSS-REFERENCE OF RELATED APPLICATIONS

This application is the U.S. National Phase under 35 U.S.C. § 371 of International Patent Application No. PCT/KR2021/016716, filed on Nov. 16, 2021, which in turn claims the benefit of Korean Application No. 10-2020-0166765, filed on Dec. 2, 2020, the disclosures of which applications are incorporated by reference herein.

TECHNICAL FIELD

The present disclosure relates to an electric vehicle body capable of efficiently responding to a front-end or rear-end collision.

BACKGROUND ART

Basically, a vehicle minimizes a transfer of load to a space in which a passenger boards or a space in which a battery is mounted in the case of an electric vehicle, by absorbing as much collision energy as possible during a front-end or rear-end collision.

To this end, an anti-intrusion zone of the vehicle body, which must suppress intrusion of a collision load and prevent deformation, is designed to be strong. In the case of the electric vehicle, a material which is very strong and thick, should be applied to a member surrounding the battery space, which becomes a factor increasing a weight of the vehicle body.

(Patent Document 1) JP 5698581 B2

SUMMARY OF INVENTION

Technical Problem

An aspect of the present disclosure is to provide an electric vehicle body ca able of minimizing intrusion of a collision load into a passenger space and a battery space during a front-end or rear-end collision.

Solution to Problem

According to an aspect of the present disclosure, an electric vehicle body includes: a front side member having one side coupled to a front bumper beam, and the other side branching off to include a first branch portion and a second branch portion; a first front cross member extended in a width direction of a vehicle body, and coupled to the first branch portion and the second branch portion; a side seal extended in a longitudinal direction of the vehicle body, and coupled to the second branch portion; a front subframe coupled to the front side member; and a battery case, which includes a reinforcing member extended in a longitudinal direction of the vehicle body and is coupled to the first front cross member and the side seal, wherein a coupling position of the first branch portion and the first front cross member and a first coupling position of the first branch portion and the front subframe may overlap with an imaginary cross-section formed by extending a cross-section of the reinforcing member in the longitudinal direction of the vehicle body.

According to another aspect of the present disclosure, an electric vehicle body includes: a rear side member having one side coupled to a rear bumper beam; a first rear cross member extended in a width direction of a vehicle body, and coupled to the rear side member; a side seal extended in a longitudinal direction of the vehicle body, and coupled to the rear side member; a rear subframe having one side coupled to the rear side member and the other side coupled to the first rear cross member; and a battery case, which includes a reinforcing member extended in a longitudinal direction of the vehicle body, and is coupled to the first rear cross member and the side seal, wherein a fourth coupling position of the rear subframe and the first rear cross member may overlap with an imaginary cross-section formed by extending a cross-section of the reinforcing member in the longitudinal direction of the vehicle body.

Advantageous Effects of Invention

As set forth above, according to the present disclosure, by configuring a reinforcing member of the battery case to perform a role of a path of a collision load and a direct load support member, it is possible to efficiently suppress intrusion and deformation of the collision load and reduce the weight by distributing the load from the vehicle body during a front-end or rear-end collision.

BRIEF DESCRIPTION OF THE DRAWINGS

FIG. 1 is an exploded perspective view illustrating an electric vehicle body according to an embodiment of the present disclosure.

FIG. 2 is a bottom view illustrating an electric vehicle body according to an embodiment of the present disclosure, which illustrates a state before attaching a battery case and a subframe.

FIG. 3 is a side view illustrating an electric vehicle body according to an embodiment of the present disclosure, which illustrates a state before attaching a battery case and a subframe.

FIG. 4 is a bottom view illustrating an electric vehicle body according to an embodiment of the present disclosure, which illustrates a state in which a battery case and a subframe are attached.

FIG. 5 is a cross-sectional view taken along line A-A of FIG. 4, which illustrates a state in which a battery case and a subframe attached.

FIGS. 6 and 7 are enlarged perspective views illustrating coupling between a first front cross member and a battery case of an electric vehicle body according to an embodiment of the present disclosure.

FIG. 8 is a corresponding view of FIG. 4 for lustrating a path of a collision load.

FIG. 9 is a corresponding view of FIG. 5 for illustrating a path of a collision load.

FIG. 10 is an enlarged view of a portion of FIG. 5.

MODE FOR INVENTION

In a vehicle body, an energy absorption zone maximally absorbing collision energy during a front-end or rear-end collision and an anti-intrusion zone suppressing intrusion of a collision load and preventing deformation as a passenger space and a battery space may be designed.

The energy absorption zone is designed to be relatively weak to induce deformation, thereby preventing the collision load from being transferred to the anti-intrusion zone. On the other hand, the anti-intrusion zone should be designed to be relatively strong so that it is not deformed to protect the passenger space and the battery space.

To this end, the load may be distributed most efficiently by increasing the number of load support members, but in the case of a normal electric vehicle, since the anti-intrusion zone is a space in which a battery must be mounted, deformation must be prevented only with a member surrounding the battery space without forming a load support member.

In order for the member surrounding the battery space to support the collision load and suppress intrusion, as described above, a very strong and thick material should be applied to the member, which becomes a factor increasing the weight of the vehicle body.

In the present disclosure, by using a battery case deviating from the general concept described above to be protected, as a load support member, a method capable of obtaining an effect equivalent to that of the configuration in which the load support member is disposed within the anti-intrusion zone, intends to be proposed.

Hereinafter, the present disclosure is explained in detail through exemplary drawings. In adding reference numerals to components of each drawing, it should be noted that the same components have the same numerals as much as possible even if they are displayed on different drawings.

In the description below, the terms “front side”, “front”, “rear side”, “rear”, “forward and backward”, “above”, “below”, “left and right”, “inner”, “outer.”, “inside”, “outside”, and the like are defined based on the vehicle or vehicle body.

In this specification, an electric vehicle refers to various vehicles receiving a power source from a battery and moving objects to be transported such as people, animals, or objects from a starting point to a destination. These vehicles are not limited to those driving on roads or tracks.

FIG. 1 is an exploded perspective view illustrating an electric vehicle body according to an embodiment of the present disclosure. FIG. 2 is a bottom view illustrating an electric vehicle body according to an embodiment of the present disclosure, and FIG. 3 is side view which lustrates a state before attaching a battery case and a subframe. FIG. 4 is a bottom view illustrating an electric vehicle body according to an embodiment of the present disclosure, and FIG. 5 is a cross-sectional view taken along line A-A of FIG. 4, which illustrates a state in which a battery case and a subframe are attached.

A skeletal structure of the vehicle body may include a side member extended in a longitudinal direction (X) of the vehicle and forming a side surface of the vehicle body, and a plurality of cross members extended in a width direction (Y) of the vehicle and coupled to both side members.

The plurality of cross members may be coupled to the side member at intervals from each other from the front end to the rear end of the vehicle body, and the side member may be called a front side member 110, a rear side member 210, or the like, depending on a position to which the cross member is coupled or a position with respect to a floor panel (not shown). Meanwhile, a side seal 300 may be provided on a side surface the vehicle to protect a passenger space during a side collision and to form an external shape of the side surface.

As illustrated in FIG. 1, a battery case 400 may be mounted in the middle of an electric vehicle body according to an embodiment of the present disclosure, and to this end, the battery space 40 in which the battery case is mounted is provided in the electric vehicle body. The battery case may include a plurality of battery cells 401 capable of charging and discharging.

Above the battery space 40, a floor panel partitioning a passenger space in which a passenger boards may be installed.

FIG. 2 illustrates a battery space 40, an anti-intrusion zone 10 of the passenger space, and energy absorption zones 20 and 30 disposed in front of and behind the anti-intrusion zone, for ease of understanding.

As illustrated in more detail in FIGS. 2 to 5, the electric vehicle body according to an embodiment of the present disclosure may include a front side member 110, a first front cross member 120, a side seal 300, a front subframe 150, and a battery case 400.

The front side members 110 may be provided pairs, may be extended in a longitudinal direction (X) of the vehicle body, and may be respectively disposed on both left and right sides, which is a width direction (Y) of the vehicle body.

For example, the front side member 110 may be disposed to be inclined so as to form an angle obliquely rather than being parallel to a center line O extended in the longitudinal direction (X) of the vehicle body. More specifically, the two front side members 110 may be disposed closer to each other toward a rear side.

The front side member 100 is disposed to be inclined, which is because both ends of a front bumper beam 60 (see FIG. 2) have a curvature toward the rear side, so that a collision load applied to the front side member enters obliquely. As such, by setting an angle of the front side member to be almost parallel to a direction of the collision member, the collision load may be received as maximally as possible.

In addition, the front side member 110 may be connected to the front bumper beam, so that one end connected to the front bumper beam 60, that is, the center point of the front end is disposed in a position between 20% or more and less than 30% from the outside to the inside of an entire vehicle width.

For example, when the front side member 110 is connected to the front bumper beam 60 at a position corresponding to 25% from the outside to the inside of the entire vehicle width, during a small overlap collision (when only 25% of a driver’s or passenger’s side of the entire vehicle width collides with an obstacle at a speed of 64 km/h), the front side member may perform a role in resisting the collision load.

The front side member 110 can effectively transfer a collision load applied to the front side member from the front bumper beam 60 to the vehicle body via the first front cross member 120, or the like. In addition, during the small overlap collision, the front side member can perform a role such as drawing out vehicle’s width direction (Y) behavior.

Hereinafter, for convenience, only one of the two front side members 110 will be described. It should be noted that the other one of the two front side members can be symmetrically disposed and include the configuration of the front side member described symmetrically.

The front side member 110 may include a front portion 111, and a first branch portion 112 and a second branch portion 113 branched off from the front portion.

The front portion 111 is a member forming a front portion of the front side member 110, and extending onto a straight line. One end of the front portion, that is, a front end may be connected to a front bumper beam 60, and the other end thereof, that is, a rear end may be connected to a first branch portion 112 or a second branch portion 113, or a first branch portion and a second branch portion.

The front portion 111 may be formed of, for example, a tubular member having a cross-sectional shape such as a square, or the like, but an embodiment is not necessarily limited thereto, and may be formed of a member formed of a single plate material having a cross-sectional shape, bent or curved to have an open cross-section, or a member formed by bonding two or more plate materials.

The front portion 111 may be formed of, for example, a metal material such as a steel material, or the like, and may be molded by forming using a press, stamping, bending, roll forming, or a combination thereof.

More specifically, the front portion 111 may be formed of a plate material such as 980 XF (Extra Formability) steel, or the like, having a thickness of about 1.5 mm to 1.7 mm produced by the present applicant. Here, the 980 XF steel is a type of steel having a tensile strength of 980 MPa or more and a yield strength of 600 MPa or more, and exhibiting a high elongation.

The first branch portion 112 is branched from the other end of the front portion 111 in a first direction. The first branch portion may form a rear inner member of the front side member 110. Accordingly, one end of the first branch portion, that is, the front end may be connected to the other end of the front portion.

The first branch portion 112 may be formed of, for example, a tubular member having a cross-sectional shape such as, a square, or the like, but an embodiment of the present disclosure is not necessarily limited thereto, and may be formed of a member formed of a single plate material having a cross-sectional shape, bent or curved to have an open cross-section, or a member formed by bonding two or more plate materials.

The other side of the first branch portion 112 may be connected to a front surface of the first front cross member 120 and a front surface of a dash panel 130 extended in a width direction (Y) of the vehicle body.

In addition, the other side of the first branch portion 112 may be bent downwardly, thereby forming a curved portion 114 (see FIG. 5). The curved portion may be in contact with the front surface of the dash panel 130, and one side surface of an end of the curved portion may be in surface contact with the front surface of the first front cross member 120, and may be fixed thereto by, for example, welding.

In the electric vehicle body according to an embodiment of the present disclosure, a coupling position P of the first branch portion 112 and the first front cross member 120 may be determined according to the number of divided spaces within the battery case 400.

For example, when the space within the battery case 400 is divided into three parts, the coupling position P of the first branch portion 112 and the first front cross member 120 may be aligned to correspond to a ⅓ point of the length thereof in the width direction (Y) from a side frame 420, to be described later of the battery case. When the space within the battery case is divided into four parts, the coupling position P of the first branch portion and the first front cross member may be aligned to correspond to a ¼ point of the length thereof in the width direction (Y) from the side frame of the battery case.

The first branch portion 112 may be continuously and integrally molded with the front portion 111, and may extend linearly following the front portion. In the drawings, an example in which the first branch portion extends onto a straight line from the front portion is illustrated, but an embodiment thereof is not necessarily limited thereto. For such a configuration extended as above, the first branch portion may have a cross-sectional shape corresponding to the cross-sectional shape of the front portion.

When the first branch portion 112 extends linearly from the front portion 111, the second branch portion 113 may be fixed to the first branch portion or the front portion by welding, for example.

The second branch portion 113 is branched from the other end of the front portion 111 in a second direction, different from the first direction. The second branch portion may form a rear outer member of the front side member 110.

In addition, the second branch portion 113 may be bent or curved to have an approximately L-shape as a whole when viewed from above.

Accordingly, one end of the second branch portion 113 may have one side surface fixed to a side surface of the first branch portion 112 by welding, for example, and the other end of the second branch portion may be connected to the side seal 300 of the vehicle body extended in the longitudinal direction (X) of the vehicle and the first front cross member 120.

More specifically, the other end of the second branch portion 113 may be fixed to the front surface of the side seal 300 and the front surface of the first front cross member 120 by welding, for example, to be in contact with the side seal and the first front cross member simultaneously.

The end of the second branch portion 113 may contact the front and bottom surfaces of the first front cross member 120, so that the second branch portion may reliably transfer a collision load to at least the first front cross member.

In addition, the end of the second branch portion 113 may be in contact with the front surface of the side seal 300 and fixed to the end of the side seal, so that the second branch portion may also transfer a collision load to the side seal.

In the electric vehicle body according to an embodiment of the present disclosure, the front side member 110 is not limited to the above-described configuration.

For example, the second branch portion 113 may be continuously and integrally molded with the front portion 111 to extend linearly following the front portion, and the first branch portion 112 may be fixed to the second branch portion or the side surface of the front portion by welding, for example.

As described above, connecting the first branch portion 112 continuously and integrally to the front portion 111 or connecting the second branch portion 113 continuously and integrally to the front portion 111 may be selected according to which side of the first front cross member 120 or the side seal 300 is to transfer more impact load.

Alternatively, the front portion 111, the first branch portion 112, and the second branch portion 113 may be respectively molded, and then connected and fixed to each other by welding, for example, so that a front side member 110 may be manufactured. In this case, there is an advantage in that a degree of freedom in assembly, dimension, material, and the like can be expanded in manufacturing the front side member.

The first branch portion 112 and the second branch portion 113 may be formed of, for example, a metal material such as a steel material, and the front portion and the first branch portion, which are integrally formed, and the front portion and the second branch portion, which are integrally formed, may be formed by machining, such as, stamping, roll forming, or the like, for example.

More specifically, the first branch portion 112 and the second branch portion 113 may be made of a plate material such as 1470 HPF (Hot Press Forming) steel having a thickness of about 1.7 mm to 2.0 mm produced by the present applicant. Here, 1470 HPF steel is a type of steel that can freely form a shape of parts while obtaining a tensile strength of 1,470 MPa or more.

The first branch portion 112 and the second branch portion 113 may be formed of a material having a higher strength than the strength of the front portion 111, As described above, through a combination of the strengths of the plate materials forming the front side member 110, an impact absorption capacity of the front side member can be maximized.

In addition, the first branch portion 112 and the second branch portion 113 may be formed thicker than the thickness of the front portion 111, As described above, the branch portions, relatively thicker than the front portion may enhance support rigidity of the front side member 110 itself during a frontal collision of a vehicle. Accordingly, the first branch portion and the second branch portion can maximize the impact absorption capacity of the front side member.

The first front cross member 120 may be extended in a width direction (Y) of the vehicle and be connected to the first branch portion 112 and the second branch portion 113 of the front side member 110, and at the same time, and may be extended in a longitudinal direction (X) of the vehicle and connect two side seals 300 forming a side surface of the vehicle body.

The electric vehicle body according to an embodiment of the present disclosure may further include a second front cross member 140 extended in the width direction (Y) of the vehicle and connecting both sides of the front side members 110.

The second front cross member 140 may be located in front and above the first front cross member 120, and be coupled to the first branch portions 111 of both sides of the front side members 110.

The first and second front cross members 120 and 140 may be provided as, for example, a tubular member having a hollow portion thereinside and having a polygonal cross-sectional shape of a square or larger, but is not necessarily limited thereto, and may be formed of a member formed of single plate material having a cross-sectional shape bent or curved to have an open cross-section, or a member formed by bonding two or more plate materials.

After the first and second front cross members 120 and 140 are coupled to both sides of the front side members 110, weight reduction is possible while maintaining torsion or bending rigidity of the vehicle body.

For the first and second front cross members 120 and 140, for example, by using ultra-high-strength steel of 980 MPa or more, an optimal combination for weight reduction as well as adding rigidity of the front cross members can be achieved.

More specifically, the first and second front cross members 120 and 140 may be made of a plate material such as 1470 Martensitic (MART) steel produced by the present applicant and having a thickness of about 1.1 mm to 1.5 mm. Here, the 1470 MART steel is a type of steel having a tensile strength of 1,470 MPa or more, a yield strength of 1,050 MPa or more, thereby improving collision safety.

In addition, the first front cross member 120 may have a greater thickness than the second front cross member 140.

The side seal 300 may be formed to extend in longitudinal direction (X) of the vehicle in lower portions of both left and sides of the vehicle body and disposed.

For example, the side seal 300 may include a side seal inner panel and a side seal outer panel, and the side seal may be integrally coupled by welding the side seal inner panel and the side seal outer panel at a lower end and an upper end thereof. By coupling the side seal inner panel to a floor panel, the side seal may be installed on the vehicle body.

The side seal 300 may be formed of, for example, a metal material such as a steel material, and may be formed by forming or bending using a press, roll forming, or a combination thereof.

In the side seal 300, the collision performance of the side seal may be secured by adjusting a material of the plate material forming the side seal and a strength or thickness of the material. For example, by using ultra-high strength steel of 980 MPa or more, an optimal combination for reducing the weight of the side seal may be achieved.

More specifically, the side seal 300 may be made of a plate material such as 1470 MART steel having a thickness of about 1.1 mm to 1.3 mm produced by the present applicant.

The side seal 300 serves as a vehicle body structure, important for responding to front, rear, and side collisions of a vehicle. Optionally, since buckling easily occurs in various collision conditions when an inside of the side seal is hollow, various types of reinforcing means may be supplemented inside the side seal.

In the front subframe 150, both ends of two transverse members 151 formed extended in a width direction (Y) of the vehicle are connected two longitudinal members 152 formed extended in a longitudinal direction (X) of the vehicle, so that it forms a substantially rectangular frame shape.

A mounting bracket for a steering gearbox may be provided on one of the transverse members 151, and a mounting bracket for mounting one end of a suspension arm may be provided on both ends thereof.

A first connection bracket 153 extended in the longitudinal direction (X) of the vehicle may be installed at a rear end of a longitudinal member 152. Since a bolt hole is formed in the first connection bracket, the first connection bracket may be coupled to an end of the first branch portion 112 of the front side member 110 by bolting.

Specifically, the first connection bracket 153 may be coupled by being bolted to a bottom surface at an end of the curved portion 144 of the first branch portion 112. The first connection bracket and the end of the first branch portion form a first coupling position P1.

Since the first branch portion 112 and the first front cross member 120 are coupled, the first coupling position P1 between the first connection bracket 153 and the end of the first branch portion 112 is located to be adjacent to a coupling position P between the first branching portion and the first front cross member.

In addition, the longitudinal member 152 may be coupled to the front side member 110 by bolting at the front end and the rear end, respectively, Here, a coupling point with the rear end is referred to as a second coupling position P2, and a coupling point with the front end is referred to as a third coupling position P3.

Optionally, the second coupling position P2 may be located to correspond to a point where the first branch portion 112 and the second branch portion 113 of the front side member 110 are branched.

As described above, the front subframe 150 may be coupled to the front side member 110 at a plurality of coupling positions P, P1, and P2, that is, at six coupling positions, to increase rigidity of the coupling portion and may be stably mounted on and supported by the front side member.

FIGS. 6 and 7 are enlarged perspective views illustrating coupling between a first front cross member and a battery case of an electric vehicle body according to an embodiment of the present disclosure.

The battery case 400 has a substantially rectangular parallelepiped shape, and have a plurality of battery cells 401 accommodated therein.

The battery case 400 may include a case body 402 and a cover (not shown). The case body and the cover may be coupled to each other to form a space therein.

The cover may be formed of high-strength plastic capable of securing sufficient strength while reducing weight and cost, or light metal such as aluminum. When the material is plastic, the cover may be formed by injection molding, compression molding, or the like, and when the material is metal, the cover may be formed into a predetermined shape by press processing, or the like.

The case body 402 may be directly exposed externally and may be formed of metal to more effectively protect the battery cell 401 because there is a high concern of breakage and damage by external foreign substances.

In this case, the case body 402 may be made by preparing components by machining a material such as an ultra-high strength steel material having a tensile strength of about 980 MPa or more for weight reduction, and then assembling and coupling the components.

Hereinafter, for convenience, the battery case 400 will be described focusing on the case body 402.

The case body 402 may include a plurality of bottom plates 410, a side frame 420, and at least two reinforcing members 430.

The bottom plate 410 is, for example, a flat plate made of metal such as a steel material, or the like. In the case body 402, the bottom plate may act as a member supporting the battery cell 401.

A height dimension of the side frame 420 may be interlocked and changed according to the size of the battery cell 401 embedded in the case body 402. In addition, a plurality of fastening holes 421 for being coupled to a cover may be formed on an upper surface of the side frame.

At least four side frames 420 are provided to surround the plurality of bottom plates 410, and both ends of each side frame may be cut to be inclined at a predetermined angle (e.g., approximately 45 degrees), and be in contact with corresponding other side frames, on both ends, respectively, and then bonded by welding such as arc welding, laser welding, or the like.

For example, the side frame 420 may be formed to have a rectangular closed cross-section as a whole using a metal such as a steel material, or the like. In the case body 402, the side frame may form a side wall.

As described above, the side frame 420 may constitute a 'Ring' partitioning an anti-intrusion zone the vehicle body, to serve to prevent intrusion a collision load into the battery case 400.

The front and rear side frames 420 may have a coupling groove 422 being concave in a height direction (Z) from a bottom surface thereof at a predetermined position, and penetrating across the front and rear side frames in a width direction (e.g., X direction n the drawing).

The coupling groove 422 may be formed in a shape corresponding to a cross-sectional shape of the reinforcing member 430, so that when the ends of the reinforcing member are fitted into the coupling groove, they may be shape-fitted with each other.

The bottom plate 410 and the side frame 420 may be coupled to each other by welding, such as, for example, arc welding. The bottom plate may be welded to a bottom surface of the side frame. Accordingly, the case body 402 may have an internal space by the side frame forming a closed cross-section around the plurality of bottom plates.

The case body 402 of the battery case 400 may be coupled to a surface in which a mounting frame, necessary for fixing the battery case to the vehicle body forms an external surface of the battery case in the side frame 420. For example, a flange may be formed on the mounting frame, and the flange of the mounting frame may be welded to the external surface of the side frame by arc welding, or the like.

However, the mounting frame 440 may be mounted outside the portion where the coupling groove 422 is formed the front and rear side frames 420.

The mounting frame 440 may be fixed to, for example, the first front cross member 120 of the vehicle body, the side seal, and a first rear cross member 220 described later, by bolting or the like, Thus, the battery case 400 may be fixed to the vehicle body.

In addition, the mounting frame 440 may act as a member corresponding first to collision among the battery cases 400 during a collision.

The reinforcing member 430 may include a lower reinforcing member 431 and an upper reinforcing member 432 coupled to an upper portion of the lower reinforcing member. The reinforcing member may extend over the entire length in the longitudinal direction X of the case body 402.

The lower reinforcing member 431 and the upper reinforcing member 432 may be formed by machining a single plate material of metal, such as a steel material, or the like. The reinforcing members may be formed by bending, roll forming, or the like.

For example, when the reinforcing members 431 and 432 are manufactured by roll forming, even a steel material having ultra-high strength having a tensile strength of about 980 MPa or more may be formed without difficulty. Furthermore, in roll forming, compared to press forming, it is easy to correct spring back and has an advantage of capable of reducing a corner radius of the reinforcing member.

More specifically, the lower reinforcing member 431 and the upper reinforcing member 432 may be made of a plate material such as 1470 MART steel, or the like, having a thickness of about 0.9 mm to 1.1 mm produced by the present applicant.

The lower reinforcing member 431 may have a substantially hat-shaped cross-sectional shape by bending a single plate material having a predetermined width and length several times. Accordingly, the lower reinforcing member may be formed in a substantially inverted U shape, and may have a flange 433 on both ends in a width direction (Y).

The lower reinforcing member 431 may be disposed between the plurality of bottom plates 410, and coupled to the bottom plates located on both sides thereof in the width direction (Y). The flange of the lower reinforcing member and the end of the bottom plate may be watertightly bonded to each other by welding such as arc welding, laser welding, or the like.

Both ends of the lower reinforcing member 431 in the longitudinal direction (X) may meet the front and rear side frames 420 and be coupled to the front and rear side frames. As described above, a coupling groove 422 may be formed at a coupling portion of the front and rear side frames meeting an end of the lower reinforcing member, so that the end of the lower reinforcing member may be fitted into the coupling groove and shape-fitted.

Here, the front and rear side frames 420 may be seated on the flange 433 of the lower reinforcing member 431, while the end of the lower reinforcing member may penetrate across the front and rear side frames in the width direction (e.g., X direction in the drawings) and protrude from the front and rear side frames, that is, the external surface of the battery case 400.

The reason why the end of the lower reinforcing member 431 protrudes outwardly through the coupling groove 422 of the front and rear side frames 420 is that welding should be applied to all coupling portions of the component in order to secure watertightness of the battery case 400, and in addition to the welding itself, a protrusion 434 is required to support a weld zone formed after welding so that it does not flow down.

A length of the front or rear protrusion 434, in which both ends of the lower reinforcing member 431 penetrate the front and rear side frames 420 and protrude from the front and rear side frames in a longitudinal direction (X) of the lower reinforcing member may be in a range of 5 to 10 mm. When the length of the protrusion is less than 5 mm, it is difficult to be welded, and when the length of the protrusion exceeds 10 mm, interference with peripheral parts may occur, making it difficult to mount the battery case 400.

As described above, welding may be performed between the protrusion 434 of the lower reinforcing member 431 and the coupling grooves 422 of the front and rear side frames 420 and bonded to each other by welding, such as arc welding, laser welding, or the like, and a weld zone may be formed therebetween, so that watertightness between the end of the lower reinforcing member and the side frame may be secured.

In order to further secure watertightness, coating of a plating material such as an acrylic resin, epoxy resin, silicone resin, or the like, may be additionally applied to a coupling portion of components constituting the case body 402, that is, to the welded portion. Alternatively, a member made of a metal material may be covered and bonded to surround the welded portion.

The upper reinforcing member 432 may have a substantially hat-shaped cross-sectional shape, by bending a single plate material having a predetermined width and length several times. Accordingly, the upper reinforcing member may be formed in a substantially U-shape, and may have flanges 433 on both ends in the width direction (Y).

The upper reinforcing member 432 may be disposed above the lower reinforcing member 431 and coupled to the lower reinforcing member. The upper reinforcing member and the lower reinforcing member may be bonded to each other by welding, such as, for example, spot welding, laser welding, or the like.

Both ends of the upper reinforcing member 432 in the longitudinal direction (X) may contact the front and rear side frames 420, Here, the end of the upper reinforcing member may terminate at the front and rear side frames without penetrating the front and rear side frames.

The flange 433 of the upper reinforcing member 432 covers the side top of the battery cell 401 accommodated in the case body 402 and supports the arrangement of the battery cells to be maintained.

Optionally, the upper reinforcing member 432 may be coupled to a plurality of intermediate cross members 160 extended in the width direction (Y) of the vehicle while being disposed by predetermined intervals and connecting the side seals 300 on both sides of the vehicle body and a second rear cross member 240 to be described later. These intermediate cross members and the second rear cross member may support a floor panel.

At least two reinforcing members 430 may be provided, and accordingly, the number of bottom plates 410 may be one more than that of the reinforcing member. This means that an inside of the battery case 400 may be divided into three or more parts in the width direction (Y).

For example, when a space within the battery case 400 is divided into three parts, the reinforcing member 430 may be disposed at a point ⅓ of the length of the battery case in the width direction (Y) from the side frame 420, and a total of two reinforcing members are provided. When a space within the battery case is divided into four parts, a reinforcing member may be disposed at a point ¼ of the battery case in the width direction (Y) from the side frame, a total of three reinforcing members may be provided, and it may be optionally determined that the reinforcing member is disposed at a ½ point of the center thereof.

The number of reinforcing members 430 may be determined depending on the size of a collision applied from the outside and the number of bottom plates 410.

As described above, in the present disclosure, a reinforcing member 430 comprising a lower reinforcing member 431 and an upper reinforcing member 432 having a hat-shaped cross-section, which is bent is disposed on the case body 402, and as the reinforcing member extends along a bottom of the case body and protrudes into the case body, a bent portion for impact absorption may be formed on the case body itself so that high deformation resistance against a collision load may be secured.

The battery cell 401 may be accommodated in the case body configured as described above and then coupled to the case body, so that the battery case 400 may be completed. Subsequently, the battery case may be fixed to, for example, the first front cross member 120, the side seal 300, and the first rear cross member 200 of the vehicle body using the mounting frame 440, by bolting, and coupled to the vehicle body.

In the reinforcing member 430 of the battery case 400, the front end of the reinforcing member 431, that is, the front protrusion 434 may be spaced apart from the first connection bracket 153 of the front subframe 150 by a predetermined gap. Also, among the side frames 420 of the battery case, the front side frame may be spaced apart from the first front cross member 120 by a predetermined gap.

In the electric vehicle body according to an embodiment of the present disclosure, a coupling position P of the first branch portion 112 of the front side member 110 and the first front cross member 120 may overlap an imaginary cross-section obtained by extending a cross-section of the reinforcing member (upper reinforcing member) in longitudinal direction (X) of the vehicle body. The coupling position of the first branch portion of the front side member and the first front cross member may be located at a height corresponding to the upper reinforcing member 432 of the reinforcing members 430 of the battery case.

In addition, since the first connection bracket 153 of the front subframe 150 and the end of the first branch portion 112 are coupled at the first coupling position P1, the first coupling position may also overlap with an imaginary cross-section obtained by extending cross-section (lower reinforcing member) in the longitudinal direction (X) of the vehicle body. The first coupling position between the first connection bracket of the front subframe and the end of the first branch portion may be located at a height corresponding to the lower reinforcing member 431 of the reinforcing member 430 of the battery case.

Here, the cross-section of the reinforcing member 430 means a surface of the reinforcing member in a YZ direction (a direction perpendicular to the longitudinal direction (X) of the vehicle body). Also, the imaginary cross-section is not an extension portion or a structure of a reinforcing member which actually exists, but is an imaginary plane obtained by extending the cross-section of the reinforcing member in the longitudinal direction (X) of the vehicle body while having a cross-sectional shape of the reinforcing member as it is, meaning a plane in a mathematical sense of which a thickness thereof is not set.

For example, it may be disposed so that a longitudinal axis of the reinforcing member 430, a center line of the coupling position (P) between the first branch portion 112 of the front side member 110 and the first front cross member 120 in a height direction, and a center line of the first coupling position (P1) between the first connection bracket 153 of the front subframe 150 and the end of the first branch portion 112 in the height direction cross and meet, but is not necessarily limited thereto.

In this case, the first coupling position (P1) is located below the coupling position (P) of the first branch portion and the first front cross member.

In the electric vehicle body according to an embodiment of the present disclosure, the coupling position P in which the first branch portion 112 of the front side member 110 and the first front cross member 120 meet and the first coupling position P1 in which the first branch portion and the first connection bracket 153 of the front subframe 150 meet may be disposed on the end the first branch portion, so that a load path transferring the collision load of the vehicle body may be unified.

Through the alignment of the reinforcing member 430 and the coupling positions P and P1, the reinforcing member of the battery case 400 may perform a role of supporting the collision load transferred from the front side member 110.

Further, in the electric vehicle body according to an embodiment of the present disclosure, a coupling position (Q) of the second branch portion 113 of the front side member 110 and the first front cross member 120 may overlap an imaginary cross-section obtained by extending a cross-section of the side frame 420 extended in a longitudinal direction (X) of the vehicle body extended in the longitudinal direction (X) of the vehicle body.

Here, the cross-section of the side frame 420 means a surface of the side frame in a YZ direction (direction perpendicular to the longitudinal direction (X) of the vehicle body). In addition, the imaginary cross-section is not an extension portion or a structure of a side frame which actually exists, but is an imaginary plane obtained by extending the cross-section of the side frame in the longitudinal direction (X) of the vehicle body while having a cross-sectional shape of the side frame as it is, meaning a plane in a mathematical sense of which a thickness thereof is not set.

Through such alignment of the side frame 420 and the coupling position Q, the side frame of the battery case 400 may also perform a role of supporting the collision load transferred from the front side member 110.

Therefore, in the electric vehicle body according to an embodiment of the present disclosure, the battery case 400 having the reinforcing member 430 and the side frame 420 may be fixed to the vehicle body, so that the rigidity and collision resistance of the vehicle body may be improved.

In addition, in the electric vehicle body according to an embodiment of the present disclosure, a bottom of the case body 402 may be divided into a plurality of bottom plates 410, a lower reinforcing member 431 having an open cross-section may be disposed between the bottom plates, the lower reinforcing member may extend along the bottom of the case body to penetrate the side frame 420 and open to the outside (i.e., downwardly) the case body, so that a hollow portion of the lower reinforcing member may be exposed to the outside of the battery case 400, so that there is an advantage in that the hollow portion of the lower reinforcing member may be used as a space for other parts of the vehicle.

FIG. 8 is a corresponding view of FIG. 4 for illustrating a path of a collision load, and FIG. 9 is a corresponding view of FIG. 5 for illustrating a path of a collision load.

In the electric vehicle body according to an embodiment of the present disclosure, the front side member 110 may directly adsorb collision energy applied to the front portion 111 from the front bumper beam 60.

Subsequently, the front side member 110 may have a first branch portion 112 connected to the first front cross member 120 and a second branch portion 113 connected to the side seal 300, respectively, so that an excessive collision load applied to the front portion 111 may be distributed to the first front cross member and the side seal through the first branch portion and the second branch portion to be transferred to the vehicle body.

In order word, a collision load exceeding absorption capacity of the front side member 110 may be transferred to members surrounding the battery space 40 below a floor panel while being connected to the front side member.

Since deformation into the battery space 40 should be minimized, intrusion of the collision load in a load support member should be prevented. While the side seal 300 may serve as a load support member in a frontal collision, the first front cross member 120 does not have a load support member.

In the electric vehicle body according to an embodiment of the present disclosure, the reinforcing member 430 of the battery case 400 is disposed to correspond to a point where the collision load is transferred from the first front cross member 120, deformation into the battery case 40 may be prevented from occurring.

More specifically, when a collision load exceeding the absorption capacity of the front side member 110 is transferred to the first front cross member 120, the first front cross member is deformed and is in contact with the front side frame 420 of the battery case 400, spaced apart with a predetermined gap therebetween. Subsequently, since the front side frame of the battery case may be supported by the upper reinforcing member 432 of the reinforcing member 430 therein, it is possible to prevent a collision load from intruding into the battery space 40.

In addition, in the case of a frontal collision, the front subframe 150 may additionally absorb collision energy.

Subsequently, the front subframe 150 may be connected to the end of the first branch portion 112 via a first connection bracket 153, so that the collision load exceeding the absorption capacity of the front subframe may be transferred to the first front cross member 120 and the vehicle body through the first branch portion.

When the collision load exceeding the absorption capacity of the front subframe 150 is transferred to the first front cross member 120, the first front cross member deformed and the first connection bracket 153 is in contact with an end of the lower reinforcing member 431 of the battery case, that is, the front protrusion 434, spaced apart with a predetermined gap therebetween). Subsequently, since the first connection bracket and the front subframe may be supported by a lower reinforcing member of the reinforcing member 430 protruding from the front side frame 420 of the battery case, it is possible to prevent the intrusion of the collision load into the battery space 40.

That is, by configuring one of the load paths coming from the front side with the reinforcing member 430 of the battery case 400, the reinforcing member of the battery case may directly serve as a load support member.

As described above, to perform a role of supporting the load as well as protecting the battery case 40, in the electric vehicle body according to an embodiment of the present disclosure, the front side member 110 and the front subframe 150, the first front cross member 120, and the battery case 400 may be organically connected to each other to form a load path.

Since the collision load generated in front of the vehicle may be distributed and transferred to the rear of the vehicle body, the collision performance of the electric vehicle to which the vehicle body according to the embodiment of the present disclosure is applied may be improved.

Such an electric vehicle has an advantage of securing collision performance and safety even though the weight of the vehicle increases and the space of the vehicle body is reduced due to the mounting of the battery, which can lead to improvement of marketability of the vehicle.

Referring to FIGS. 2 to 5 and 10, an electric vehicle body according to an embodiment of the present disclosure may include a rear side member 210, a first rear cross member 220, and a rear subframe 250.

The rear side member 210 may be provided in pairs, and may be respectively disposed on both left and right sides, which is a width direction (Y) of the vehicle body, while extended in a longitudinal direction (X) of the vehicle body.

For example, the rear side member 210 may extend to be parallel to a center line O extended in the longitudinal direction (X) of the vehicle body by a predetermined length from a rear side, and then the two rear side members may be disposed to move away from each other toward a front side.

The rear side member 210 may effectively transfer a collision load from the rear bumper beam 70 to the vehicle body through the side seal 300, the first rear cross member 220, or the like.

Hereinafter, for convenience, only one of the two rear side members 210 will be described. It should be noted that the other of the two rear side members may include the configuration of the rear side member, which is described, symmetrically and be symmetrically disposed.

One end of the rear side member 210, that is, a rear end thereof may be connected to the rear bumper beam 70, and the other end, that is, a front end, may be connected to one side surface of the rear side of the side seal 300.

The rear side member 210 may be formed of, for example, a tubular member having a cross-sectional shape such as a square, but is not necessarily limited thereto, and may include a member made of a single plate material having a cross-sectional shape bent or curved to have an open cross-section, or may be formed of a member formed by bonding two or more plate materials.

The rear side member 210 may be made of, for example, a metal material such as a steel material, or the like, and may be formed by forming using a press, stamping, bending, roll forming, or a combination thereof.

More specifically, the rear side member 210 may be made of a plate material such as 980 XF steel having a thickness of about 1.3 mm to 1.5 mm produced by the present applicant.

The front side of the rear side member 210 may be bent downwardly, whereby an inclined portion 214 may be formed. An end of the inclined portion may be surface contact with an inner side surface of the side seal 300.

Accordingly, one side surface of the front end of the rear side member 210 may be fixed to the inner side surface of the side seal 300 of the vehicle body extended in the longitudinal direction (X) of the vehicle by, for example, welding.

Since one side surface of the front end of the rear side member 210 is fixed to the side seal 300, the rear side member may transfer a collision load to the side seal.

The configuration, disposition, and the like, of the rear side member 210 are not limited to the above-described examples.

The first rear cross member 220 may connect the rear side members 210 to each other. In other words, the first rear cross member may be connected to the inner side surface of the rear side member. In addition, a rear subframe 2:50 to be described below may be mounted on the first rear cross member.

The electric vehicle body according to an embodiment of the present disclosure may further include a second rear cross member 240 extended in a width direction (Y) of the vehicle and connecting side seals 300 on both sides, and coupled to a front end of the rear side member 210.

The second rear cross member 240 may be located in front of the first rear cross member 220, and may be coupled to a front end of the rear side member 210. An end of the rear side member may be fixed to a rear surface of the second rear cross member by, for example, welding, and may be in contact with the side seal 300 and the second rear cross member, at the same time.

The front side end of the rear side member 210 is in contact with the rear surface of the second rear cross member 240, so that the rear side member may reliably transfer a collision load to the second rear cross member.

In addition, the second rear cross member 210 may be located above the battery case 400 and coupled to an upper reinforcing member 432 of the reinforcing member 430. The second rear cross member may support a floor panel.

The first and second rear cross members 220 and 240 may be provided as, for example, a tubular member having a hollow portion thereinside and having a polygonal cross-sectional shape of a square or larger, but is not necessarily limited thereto. The first and second rear cross members 220 and 240 may be formed of a member formed of a single plate material having a cross-sectional shape bent or curved to have an open cross-section, or a member formed by bonding two or more plate materials.

After the first and second rear cross members 220 and 240 are coupled to the rear side members 210 on both sides, weight reduction is possible while maintaining torsion and bending rigidity of the vehicle body.

For the first and second rear cross members 220 and 240, for example, by using ultra-high-strength steel of 980 MPa or more, an optimal combination for weight reduction as well as adding rigidity of the rear cross members can be achieved.

More specifically, the first rear cross member 220 may be made of plate material such as 1180 TRIP (Transformation Induced Plasticity) steel having a thickness of about. 1.1 mm to 1.3 mm produced by the present applicant. Here, the 1180 TRIP steel is a type of steel of which an elongation is improved to 45% or more while guaranteeing a tensile strength of 1180 MPa or more and a yield strength of 850 MPa or more.

The second rear cross member 240 may be made of a plate material such as 1470 MART steel having a thickness of about 1.1 mm to 1.3 mm produced by the present applicant.

In addition, the second rear cross member 240 may have higher strength than the first rear cross member 220.

The side seal 300 may be formed and disposed to extend in a longitudinal direction (X) of the vehicle on both lower left and lower sides of the vehicle body, and may be coupled to the end of the second rear cross member 240.

The side seal 300 serves as an important vehicle body structure for responding to front, rear, side collisions of a vehicle.

In the rear subframe 250, both ends of two transverse members 251 formed to extend in the width direction (Y) of the vehicle are connected to two longitudinal members 252 formed to extend in the longitudinal direction (X) of the vehicle, so that the rear subframe 250 has a substantially rectangular frame shape.

A mounting bracket for fixing a spring link of a suspension may be provided on a bottom surface of the rear subframe 250, and a mounting bracket for a mount bush for mounting a power train may be provided.

Meanwhile, a second connection bracket 223 extended in the longitudinal direction (X) of the vehicle may be installed on the first rear cross member 220. Since a bolt hole is formed in the second connection bracket, the second connection bracket can be coupled to the front transverse member 251 of the rear subframe 250 by bolting. The second connection bracket and the front transverse member form a fourth coupling position P4.

In addition, the longitudinal member 252 of the rear subframe 250 may be coupled to the middle of the rear side member 210 at a rear end thereof, by bolting, Here, a coupling point between the rear end and the rear side member is referred to as a fifth coupling position. P5.

As described above, the rear subframe 250 is coupled to the rear side member 210 at a plurality of coupling positions P4 and P5, that is at four coupling points, so that the rear subframe 250 may increase rigidity of a coupling portion and be stably mounted on the rear side member and the first rear cross member 220 and supported.

In the electric vehicle body according to an embodiment of the present disclosure, an installation position of the second connection bracket 223 on the first rear cross member 220 constituting the fourth coupling position P4 may be determined according to the number of divided spaces in the battery case 400.

For example, when the space within the battery case is divided into three parts, a fourth coupling position (P4) at the second connection bracket 223 of the first rear cross member 220 may be aligned to correspond to a ⅓ point of the length in the width direction (Y) from the side frame 420 of the battery case 400. When the space within the battery case is divided into four parts, the fourth coupling position at the second connection bracket of the first rear cross member may be aligned at a point to correspond to a ¼ point of the length in the width direction (Y) of the side frame of the battery case.

In addition, the rear end of the lower reinforcing member 431 in the reinforcing member 430 of the battery case 400, that is, the rear protrusion 434 may be spaced apart from the second connection bracket 223 of the first rear cross member 220 and the front transverse member 251 of the rear subframe 250 by a predetermined gap. Also, among the side frames 420 of the battery case, the rear side frame may be spaced apart from the first rear cross member by a predetermined gap.

In the electric vehicle body according to an embodiment of the present disclosure, the fourth coupling position (P4) between the second connection bracket 223 of the first rear cross member 220 and the front transverse member 251 of the rear sub frame 250 may overlap an imaginary cross-section obtained by extending a cross-section of the reinforcing member (upper reinforcing member) in the longitudinal direction (X) of the vehicle body. The fourth coupling position between the second connection bracket of the first rear cross member and the front transverse member of the rear subframe may be located at a height corresponding to the upper reinforcing member 432 of the reinforcing members 430 of the battery case.

For example, it may be disposed so that a longitudinal axis of the reinforcing member 430 and a center line of the fourth coupling position (P4) between the second connection bracket 223 of the first rear cross member 220 and the front transverse member 251 of the rear subframe 250 in a height direction cross and meet, but is not necessarily limited thereto.

Through the alignment of the reinforcing member 430 and the coupling positions P4 and P5, the reinforcing member of the battery case 400 may perform a role of supporting a collision load transferred from the rear subframe 250.

Therefore, in the electric vehicle body according to an embodiment of the present disclosure, since the battery case 400 having the reinforcing member 430 is fixed to the vehicle body, rigidity and collision resistance of the vehicle body can be improved.

Referring to FIGS. 8 to 10, in the electric vehicle body according to an embodiment of the present disclosure, a rear side member 210 may directly absorb collision energy from the rear bumper beam 70.

Then, the rear side member 210 has a side surface connected to the side seal 300 and an end connected to the second rear cross member 240, so that an excessive collision load applied to the rear side member may be distributed to the side seal and the second rear cross member and transferred to the vehicle body.

In other words, a collision load exceeding absorption capacity of the rear side member 210 may be transferred to some members surrounding the battery space 40 below a floor panel while being connected to the rear side member.

Since deformation must be minimized into the battery space 40, intrusion of the collision load in the load support member must be prevented. While the side seal 300 may serve to as a load support member during a rear-end collision, the first rear cross member 220 does not have a load support member.

In the electric vehicle body according to an embodiment of the present disclosure, the reinforcing member 430 of the battery case 400 may be disposed to correspond to a point where the collision load is transferred from the first rear cross member 220, so that it is possible to prevent deformation into the battery space 40 from occurring.

More specifically, since the rear subframe 250 is coupled to the rear side member 210 at a rear end of the longitudinal member 252, that is, at a fifth coupling position P5, in the case of a rear collision, the rear subframe may transfer a portion of the collision energy.

The rear subframe 250 may be connected to the first rear cross member 220 via the second connection bracket 223, so that a portion of the collision load exceeding the absorption capacity of the rear side member 210 may be transferred to the first rear cross member 220 and the vehicle body through a rear subframe.

When a collision load is transferred to the first rear cross member 220 by the rear subframe 250, as the first rear cross member is deformed, the front transverse members 251 of the rear subframe is in contact with a rear side frame 420 of the battery case 400, spaced apart from each other with a predetermined distance, or an end of the lower reinforcing member 431, that is, the rear protrusion 434. Then, since the rear side frame of the battery case can be supported by the upper reinforcing member 432 of the reinforcing member 430 therein, it is possible to prevent a collision load from intruding into the battery space 40.

Alternatively, since the rear subframe 250 can be supported by the lower reinforcing member 431 of the reinforcing member 430 protruding from the rear side frame 420 of the battery case 400, it is possible to prevent a collision load from intruding into the battery space 40.

That is, by configuring one of load paths receiving from the rear side with the reinforcing member 430 of the battery case 400, the reinforcing member of the battery case can directly serve as a load support member.

However, unlike the front side member 110, the rear side member 210 transfers a portion of collision loads to the reinforcing member 430 of the battery case 400 through the rear subframe 250.

As described above, the electric vehicle body according to an embodiment of the present disclosure may perform a role of supporting the load as well as protecting the battery space 40, and in order for the electric vehicle body to perform such a role as described above, the rear side member 210 and the rear subframe 250, the first rear cross member 220, and the battery case 400 may be organically connected to each other to form a load path.

Since the collision load generated at the rear side of the vehicle can be distributed and transferred to the front side of the vehicle body, collision performance of the electric vehicle to which the vehicle body according to the embodiment of the present disclosure is applied may be improved.

Such an electric vehicle has an advantage of securing the collision performance and safety even though the weight of the vehicle increases and the space of the vehicle body is reduced due to the mounting of the battery, which leads to improvement of marketability of the vehicle.

By configuring the reinforcing member of the battery case to perform a role of a path of the collision load and a direct load support member, it is possible to obtain an effect for efficiently suppressing the intrusion and deformation of the collision load and reducing the weight by distributing the load from the vehicle body during a front or rear collision.

The above description is merely an example of the technical idea the present disclosure, and various modifications and variations can be made to those ski led in the art without departing from the essential characteristics of the present disclosure.

Therefore, the embodiments disclosed in the present disclosure are not intended to limit the technical spirit of the present disclosure, but to explain, and the scope of the technical spirit of the present disclosure is not limited by these embodiments. The protection scope of the present disclosure should be construed according to the following claims, and all technical ideas within the equivalent range should be construed as being included in the scope of the present disclosure.

| Description of Reference Numerals | |
|---|---|
| 10: Anti-intrusion zone | 20, 30: Energy absorption zone |
| 40: Battery space | 60: Front bumper beam |
| 70: Rear bumper beam | |
| 110: Front side member | 111: Front portion |
| 112: First branch portion | 113: Second branch portion |
| 120: First front cross member | 130: Dash panel |
| 140: Second front cross member | 150: Front subframe |
| 151, 251: Transverse member | 152, 252: Longitudinal member |
| 153: First connection bracket | 160: Intermediate cross member |
| 210: Rear side member | 220: First rear cross member |
| 223: Second connection bracket | 240: Second rear cross member |
| 250: Rear subframe | 300: Side seal |
| 400: Battery case | 401: Battery cell |
| 402: Case body | 410: Bottom plate |
| 420: Side frame | 430: Reinforcing member |
| 431: Lower reinforcing member | 432: Upper reinforcing member |
| 434: Protrusion | 440: Mounting frame |

While example embodiments have been shown and described above, it will be apparent to those skilled in the art that modifications and variations could be made without departing from the scope of the present disclosure as defined by the appended claims.

The invention claimed is:

1. An electric vehicle body, comprising:

a front side member having one side coupled to a front bumper beam, and the other side branching off to include a first branch portion and a second branch portion;

a first front cross member extended in a width direction of a vehicle body, and coupled to the first branch portion and the second branch portion;

a side sill extended in a longitudinal direction of the vehicle body, and coupled to the second branch portion;

a front subframe coupled to the front side member; and a battery case, which includes a reinforcing member extended in the longitudinal direction of the vehicle body, and is coupled to the first front cross member and the side sill, wherein a coupling position P of the first branch portion and the first front cross member and a first coupling position of the first branch portion and the front subframe overlaps with an imaginary cross-section formed by extending a cross-section of the reinforcing member in the longitudinal direction of the vehicle body.

2. The electric vehicle body of claim 1, wherein the front side member comprises a front portion extending linearly, and having one side coupled to the front bumper beam, wherein the first branch portion and the second branch portion are branched from the other side of the front portion.

3. The electric vehicle body of claim 2, wherein the first branch portion and the second branch portion are formed of a material having a higher strength than the front portion.

4. The electric vehicle body of claim 2, wherein the first branch portion and the second branch portion are formed to be greater than the thickness of the front portion.

5. The electric vehicle body of claim 1, further comprising:

a second front cross member extended in a width direction of the vehicle body, and coupled to the front side member, wherein the second front cross member is located in front and above the first front cross member, and is coupled to the first branch portion, wherein the first front cross member is formed to be greater than a thickness of the second front cross member.

6. The electric vehicle body of claim 1, wherein the front side member is disposed to be inclined at a predetermined angle with respect to a center line extended in the longitudinal direction of the vehicle body, wherein the front side member is respectively disposed on both left and right sides of the vehicle body, which is a width direction of the vehicle body, wherein the two front side members are disposed closer to each other toward a rear side of the vehicle body.

7. The electric vehicle body of claim 1, wherein the first branch portion is bent downwardly to form a curved portion, and an end of the curved portion has one side surface in contact with a front surface of the first front cross member and fixed thereto.

8. The electric vehicle body of claim 7, wherein a first connection bracket extended in the longitudinal direction of the vehicle body is installed at a rear end of the front subframe, and the first connection bracket and the first branch portion form the first coupling position.

9. The electric vehicle body of claim 8, wherein the first connection bracket is coupled to a bottom surface at the end of the curved portion, wherein the first coupling position is located below the coupling position of the first branch portion and the first front cross member.

10. The electric vehicle body of claim 8, wherein the rear end of the front subframe is coupled to the front side member to form a second coupling position, wherein the second coupling position is located to correspond to a point at which the first branch portion and the second branch portion are branched from the front side member.

11. The electric vehicle body of claim 8, wherein the battery case comprises a case body accommodating battery cells, wherein the case body includes, a plurality of bottom plates;

a side frame surrounding the plurality of bottom plates; and comprising at least two reinforcing members disposed between the plurality of bottom plates, and coupled to the side frame at both ends thereof in a longitudinal direction.

12. The electric vehicle body of claim 11, wherein the reinforcing member comprises a lower reinforcing member and an upper reinforcing member coupled to an upper portion of the lower reinforcing member, wherein a coupling groove penetrating the side frame in a width direction while being concave in a height direction from a bottom surface of the side frame is formed, at a coupling site of the side frame meeting an end of the lower reinforcing member, wherein the end of the lower reinforcing member forms a protrusion penetrating the side frame through the coupling groove and protruding from the side frame.

13. The electric vehicle body of claim 11, wherein a coupling position Q of the second branch portion and the first front cross member overlaps with an imaginary cross-section formed by extending a cross-section of the side frame extended in the longitudinal direction of the vehicle body in the longitudinal direction of the vehicle body.

14. The electric vehicle body of claim 1, wherein a longitudinal axis of the reinforcing member is formed to cross a center line of the coupling position between the first branch portion and the first front cross member in a height direction, and a center line of the first coupling position in a height direction.

15. The electric vehicle body of claim 12, wherein the lower reinforcing member has an inverted U-shaped cross-sectional shape, the upper reinforcing member has a U-shaped cross-section, and a hollow portion of the lower reinforcing member is disposed to be exposed externally or the battery case.

16. The electric vehicle body of claim 12, wherein the case body further comprises a mounting frame for fixing the battery case to the vehicle body, wherein the mounting frame is mounted beyond a site at which the coupling groove is formed in the side frame.

17. An electric vehicle body, comprising:

a rear side member having one side coupled to a rear bumper beam;

a first rear cross member extended in a width direction of a vehicle body, and coupled to the rear side member;

a side sill extended in a longitudinal direction of the vehicle body, and coupled to the rear side member;

a rear subframe having one side coupled to the rear side member and the other side coupled to the first rear cross member; and a battery case, which includes a reinforcing member extended in the longitudinal direction of the vehicle body, and is coupled to the first rear cross member and the side sill, wherein a fourth coupling position of the rear subframe and the first rear cross member overlaps with an imaginary cross-section formed by extending a cross-section of the reinforcing member in the longitudinal direction of the vehicle body.

18. The electric vehicle body of claim 17, wherein the other side of the rear side member is bent downwardly to form an inclined portion, wherein the inclined portion has one side surface in contact with a side surface of the side sill and fixed thereto, the electric vehicle body further comprising:

a second rear cross member extended in a width direction of the vehicle body and coupled to the side sill and coupled to an end of the rear side member, wherein the second rear cross member is located in front of the first rear cross member, and is located above the battery case, wherein the second rear cross member is formed of a material having a higher strength than the first rear cross member.

19. The electric vehicle body of claim 17, wherein the rear side member extends to be parallel to a center line extended in the longitudinal direction of the vehicle body by a predetermined length from a rear side of the vehicle body, and the rear side member is respectively disposed on both left and right sides, which is a width direction of the vehicle body, and the two rear side members are disposed to be farther from each other toward a front side of the vehicle body.

20. The electric vehicle body of claim 17, wherein a second connection bracket extended in the longitudinal direction of the vehicle body is installed on the first rear cross member, and the second connection bracket and a front transverse member of the rear subframe forms the fourth coupling position.

* * * * *